United States Patent [19]
Mitamura

[11] Patent Number: 5,626,974
[45] Date of Patent: May 6, 1997

[54] ROLLING BEARING FOR USE UNDER HIGH TEMPERATURE CONDITIONS

[75] Inventor: Nobuaki Mitamura, Kanagawa, Japan

[73] Assignee: NSK Ltd., Tokyo, Japan

[21] Appl. No.: 519,643

[22] Filed: Aug. 25, 1995

[30] Foreign Application Priority Data

Aug. 25, 1994 [JP] Japan .................... 6-224134

[51] Int. Cl.$^6$ .................... C23C 8/32
[52] U.S. Cl. .................... 428/698; 384/492; 384/548; 384/625; 384/912; 148/318; 148/319; 148/906; 428/457
[58] Field of Search .................... 428/698, 457, 428/408; 384/492, 548, 625, 912; 148/318, 317, 906

[56] References Cited

U.S. PATENT DOCUMENTS 4,871,268 10/1989 Furumura et al. .................... 384/492
4,966,751 10/1990 Kaede et al. .................... 420/34

*Primary Examiner*—Archene Turner
*Attorney, Agent, or Firm*—Sughrue, Mion, Zinn, Macpeak & Seas

[57] ABSTRACT

In a rolling bearing including an inner race, an outer race and a plurality of rolling elements in which at least one member of the inner race, the outer race and the rolling elements is made of a high carbon steel material and has a Rockwell hardness of $H_RC$ 60 or more, the high carbon steel material including, in a surface thereof, solid solution of carbon C and solid solution of nitrogen N which are adjusted to satisfy relationships of 0.8 wt $\%\leq C\leq 1.2$ wt % and 0.1 wt $\%\leq N\leq 0.5$ wt % with the balance Fe, and in which the retained austenite existing in the high carbon steel material is adjusted to substantially 0 wt %, the rolling beating exhibits superior dimensional stability and high endurance even when it is used under high-temperature conditions, and exhibits high productivity with low cost.

1 Claim, 4 Drawing Sheets

ROLLING BEARING FOR USE UNDER HIGH TEMPERATURE CONDITIONS

BACKGROUND OF THE INVENTION

The present invention relates to a rolling bearing, and more particularly to a rolling bearing for use in industrial machines and the like under high-temperature conditions, typically 130° C. or more.

Rolling bearings are generally used under severe conditions such that they are subjected to repeated shearing stress under high contact pressure. Therefore, the rolling bearings are required to have sufficiently high rolling fatigue life (hereinafter referred to simply as "life") so that they can withstand the applied shearing stress. A bearing material for rolling members such as an inner race, an outer race, rolling elements and the like forming the rolling bearings has conventionally been provided with high carbon chromium steel, which is subjected to hardening and tempering at 160° to 200° C. to provide a Rockwell hardness of $H_RC$ 60 to 64 to thereby achieve a longer life.

When such rolling bearings are used under high-temperature conditions at 130° C. or more, the retained austenite phase existing in the high-carbon chromium steel as the bearing material is decomposed. Accordingly, deterioration of dimensional stability occurs and the rolling members expand within a short time.

Under these circumstances, it has been proposed that rolling bearings intended for use at high temperatures should be subjected to tempering at a temperature, e.g. 240° C. or more, that is higher than the above-described usual tempering temperature (160° to 200° C.). Thus, the retained austenite is completely decomposed so that its content becomes substantially 0 wt % before finished products of rolling bearings are manufactured (this approach is hereinafter referred to as the "first conventional method").

Since the first conventional method involves tempering at a high temperature, the produced rolling bearing has a reduced hardness and thus a shortened life. On the other hand, since the dimensional stability is superior, the rolling bearing is acceptable to some extent.

Another approach has been proposed in which a high-carbon chromium steel includes Cr, Mo, V, Si and other elements that have a superior resisting property for temper softening (for example, Unexamined Japanese Patent Publication No. Hei. 3-82736; this approach is hereinafter referred to as the "second conventional method").

In the second conventional method, since elements such as Cr, Mo, V and Si which have the high resisting property for temper softening are added to the high-carbon chromium steel, the reduction in bearing's hardness can be suppressed to some extent even if tempering is performed at high temperatures of 240° C. or more.

According to still another approach, a high-carbon steel material is subjected to carbonitriding or nitriding for the purpose of increasing the surface carbon or nitrogen contents to form carbonitrides or nitrides. Subsequently, the steel is subjected to hardening and tempering at a high temperature of 200° to 250° C. As a result, the retained austenite remains in the surface while the retained austenite existing in the core is adjusted to be substantially 0 wt % (for example, examined Japanese Patent Publication No. Hei. 3-56305; this approach is hereinafter referred to as the "third conventional method").

In the third conventional method, since tempering is performed at a temperature of 200° to 250° C. where the retained austenite in the core of rolling members becomes 0 wt %, the dimensional stability is improved. In addition, a large amount of the retained austenite and carbonitrides are precipitated in the surface in order to extend the life of the rolling bearing.

However, the three conventional methods have the following problems.

In the first conventional method, the superior dimensional stability has been assured at the sacrifice of life characteristics. However, with the recent tendency of machines toward higher-speed operation and smaller size, the deterioration in the life characteristics has gradually become unacceptable.

In the second conventional method, the elements such as Cr, Mo, V and Si which have the superior resisting property for temper softening are added to a high carbon chromium steel so that it can suppress the reduce in hardness due to the tempering at high temperatures. However, the addition of these elements increases the cost of materials. Further, the addition of more alloy elements reduces the productivity to thereby increase the overall production cost.

In the third conventional method, the retained austenire in the core of rolling members is adjusted to be substantially 0 wt %, so that the dimensional stability of the bearing is improved. In addition, the content of carbon C contained in the high carbon steel material itself and the content of nitrogen N are sufficiently increased to precipitate carbonitrides while a large amount of retained austenite is precipitated in the surface of the bearing to increase not only its surface hardness but also the life of the bearing. However, there is a problem with this approach in the case where the depth of carbon and nitrogen diffusion is excessive with respect to the thickness of the bearing, namely, in the case where the core of the bearing is unduly limited in volume, the core signifying a range where the content of retained austenite is substantially 0 wt %. The reason is because the retained austenite in the surface layer portion decomposes to cause dimensional changes during the operation of the bearing at high temperature. Accordingly, the rolling bearing produced by the third conventional method suffers the problems that if it is used under high-temperature conditions, the retained austenite existing in the surface layer portion decomposes to cause the dimensions of the bearing to expand in a short time.

SUMMARY OF THE INVENTION

The present invention has been accomplished in view of problems with the conventional methods and has an object of providing a rolling bearing which exhibits superior dimensional stability and high endurance even when it is used under high-temperature conditions, and which exhibits high productivity with low cost.

The above-stated object of the present invention can be attained by a rolling bearing including an inner race, an outer race and a plurality of rolling elements in which at least one of the inner race, the outer race and the rolling elements is made of a high carbon steel material and has a Rockwell hardness of $H_RC$ 60 or more, the high carbon steel material including, in a surface thereof, solid solution of carbon C and solid solution of nitrogen N which are adjusted to satisfy relationships of 0.8 wt %$\leq$C$\leq$1.2 wt % and 0.1 wt %$\leq$N$\leq$0.5 wt % with the balance Fe, and in which the retained austenite existing in the high carbon steel material is adjusted to substantially 0 wt %.

The term "surface" as used herein refers a range from an outer surface of each component (the inner race, the outer race and the rolling elements) of the rolling bearing to a depth corresponding to 2% of the diameter of the rolling elements. Namely, the "surface" indicates a layer affected by a shearing stress.

DETAILED DESCRIPTION OF THE PREFERRED EMBODIMENTS

A rolling bearing according to the present invention will now be described with reference to the accompanying drawings.

As is apparent from the third conventional method, the endurance of a bearing made from a high carbon steel material can be improved by subjecting it to carbonitriding or nitriding such that carbonitrides are precipitated on the surface of the bearing. The endurance of the bearing can also be improved by precipitating a large amount of retained austenite on the surface. However, it has been found by the present inventor that dimensions of the bearing expand in a short time because of the retained austenite existing in the surface if it is used at high temperature. More specifically, in the presence of retained austenite, a bearing that is first tempered and subsequently held at a certain temperature causes dimensional changes with age as shown in FIG. 1, in which the horizontal axis plots time and the vertical axis plots the amount of bearing's expansion.

Figure 1:
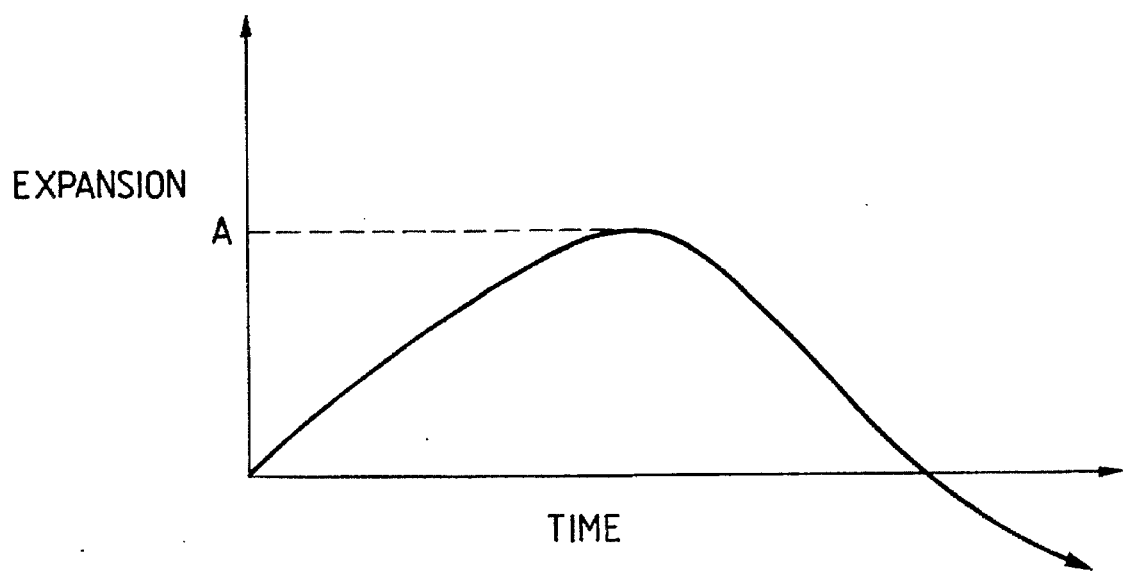
FIG. 1 is a diagram showing changes with age with respect to dimensional expansion of a bearing in the case where retained austenite exists in the surface of the bearing.

As is apparent from FIG. 1, the dimensions of bearing change with age along a quadratic curve having a maximum point of expansion A. The dimensional changes are substantially linearly proportional to the content of retained austenite. Therefore, in order to eliminate the dimensional expansion of the bearing to thereby improve its dimensional stability, the retained austenite existing in every part of the bearing including its surface must be reduced to substantially 0 wt %. Accordingly, reducing the retained austenite in the core of the bearing to 0 wt % is insufficient to secure the superior dimensional stability. The content of the retained austenite must be adjusted to substantially 0wt % in every part of the bearing.

The present inventor conducted experiments on the basis of the above finding and reached the conclusion that considering the decomposition of retained austenite in the surface, the bearing must be subjected to tempering at 270° C. or more after carbonitriding and hardening in order to secure that the content of retained austenite is reduced to substantially 0 wt %. Thus, the present inventor has substantiated that the content of retained austenite existing in every part of the bearing could be adjusted to substantially 0 wt % by tempering at a temperature not lower than 270° C.

On the other hand, since the content of retained austenite in every part of the bearing is reduced to substantially 0 wt %, the content of retained austenite existing in the surface is also made to be substantially 0 wt %. As a result, the improvement in endurance obtained by retained austenite can no longer be anticipated.

Accordingly, the present inventor further conducted endurance tests on bearing samples with their retained austenite content adjusted to 0 wt %. As the result of the endurance tests, the present inventor has found out that the endurance of the bearing is, rather than the content of carbonitrides contained in the bearing, significantly affected by the contents of "solid solution of carbon C" and "solid solution of nitrogen N" except for the carbon C and nitrogen N contained in the carbonitrides.

Figure 2A:
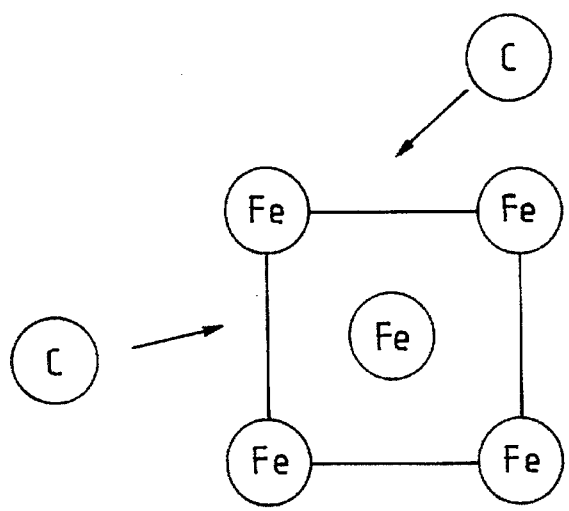
FIG. 2A is an explanatory view showing a state before solid solution of carbon enters into martensitic Fe.
Figure 2B:
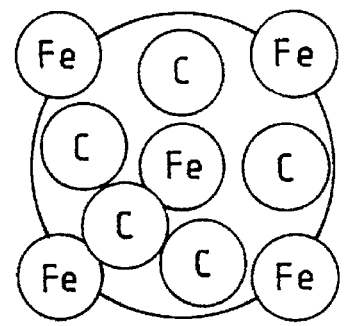
FIG. 2B is an explanatory view showing the martensitic Fe with the solid solution of carbon after entering.

That is, if a high carbon steel material as a bearing material is carburized deeply over hypereutectoid which contains the concentration of alloy elements higher than the eutectoid composition, then the carbon C existing in the steel material is separated into solid solution of carbon C which is formed of a martensite phase and an austenite phase, and carbon C which is incorporated into the carbides. Increasing the content of solid solution of C leads to increasing the carbon concentration in the martensite. Namely, as shown in FIG. 2A, atoms of carbon C force themselves into "interstices" between metallic atoms such as Fe and the like so that the atoms of carbon C form interstitial solid solution of C in the body-centered cubic lattice of the martensite. The larger the number of carbon atoms occupy the interstices, the more "tight" is the body-centered cubic lattice of the martensite (FIG. 2B) while the steel material hardens. Therefore, strength characteristics such as hardness and the like are improved to produce more durable bearings. The same explanation can be applied to the behavior of nitrogen N atoms in carbonitriding. Thus, it has been found that the endurance of bearings is influenced by the contents of solid solution of C and N more largely than the amount of carbonitrides per se.

The present inventor has also found by experimentation that the intended effectiveness in improving the endurance of bearings is not achieved when the concentrations of solid solution of C and N are too low, and that their minimum concentrations are at least 0.8 wt % for solid solution of C and at least 0.1 wt % for solid solution of N. Hence, the lower limits for the concentrations of solid solution of C and N according to the present invention are set to 0.8 wt % and 0.1 wt %, respectively.

On the other hand, the upper limit for the concentration of solid solution of C is set to 1.2 wt %. This is because in order to have the solid solution of carbon exceeding 1.2 wt %, the hardening temperature must be set to 950° C. or more but if hardening is done at such high temperatures, coarse crystal grains are formed to adversely affect the materials strength. Further, a continuous furnace (production furnace) which enables hardening at temperatures of 950° C. or more becomes expensive, and has economical disadvantageous. Hence, the upper limit for the concentration of solid solution of C is set to 1.2 wt %.

According to the present invention, the upper limit for the concentration of solid solution of N is set to 0.5 wt %. The addition of nitrogen atoms N improves the resisting property for temper softening and retards the decomposition of retained austenite. However, if the content of solid solution of N exceeds 0.5 wt %, the retained austenite existing in the surface cannot decompose completely even if tempering is done at 270° to 300° C. Therefore, the dimensional stability of bearings is adversely affected. If, on the other hand, tempering is done at a temperature exceeding 300° C., the hardness of the core of the bearing material is reduced so that there is a possibility that the required Rockwell hardness cannot be attained within a region from the surface to the necessary depth (equivalent to the depth to which shearing stress is applied). Namely, solid solution of N contained in amounts exceeding 0.5 wt % makes it difficult to maintain the required Rockwell hardness of $H_RC$ 60 or more for bearings. Hence, the upper limit for the concentration of solid solution of N is set to 0.5 wt %.

EXAMPLE

Examples conducted in the present invention will now be described with reference to accompanying drawings.

Table 1 shows the characteristics of rolling bearing samples prepared in accordance with the present invention, as well as comparative samples and a conventional sample prepared by the first conventional method.

| Gas composition | |
| --- | --- |
| Raw gas (propane, butane, etc.) | 2% |
| Ammonia | 2 to 5% |
| Endothermic atmosphere (CO + $H_2$) | bal. |
| Carbonitriding temperature | 800 to 900° C. |
| Carbonitriding time | 4 hours |

Comparative bearings E and F were also subjected to carbonitriding under the same conditions. Hence, they had generally the same contents of carbon C and nitrogen N as invention bearings A to D. However, since comparative bearing E was hardened at 800° C. lower than the temperatures employed with invention bearings A to D, comparative bearing E had a lower content of solid solution of C and N. On the other hand, since comparative bearing F was tempered at 310° C. higher than the temperatures employed with invention bearings A to D, comparative bearing F had a higher content of solid solution of N. Invention bearings A to D and comparative bearings E and F all had Rockwell hardness values of $H_RC$ 60 or more, thus maintaining the necessary surface hardness for rolling bearings.

The first conventional bearing G was not subjected to carbonitriding but hardening in an endothermic atmosphere (CO+$H_2$) at 840° C. for 4 hours, followed by tempering at

TABLE 1

| Run No. | Bearing material | Surface C, wt % | | Surface N, wt % | | Rockwell hardness on C scale | Heat treatments |
| --- | --- | --- | --- | --- | --- | --- | --- |
| | | Total C | Solid solution of C | Total N | Solid solution of N | | |
| Invention A | SUJ 2 | 1.32 | 0.84 | 0.20 | 0.11 | 61.4 | CN → H at 840° C. → T at 270° C. |
| Invention B | SUJ 2 | 1.32 | 0.90 | 0.20 | 0.17 | 61.6 | CN → H at 860° C. → T at 270° C. |
| Invention C | SUJ 2 | 1.46 | 0.97 | 0.36 | 0.27 | 61.8 | CN → H at 880° C. → T at 280° C. |
| Invention D | SUJ 2 | 1.46 | 1.02 | 0.36 | 0.31 | 61.6 | CN → H at 900° C. → T at 290° C. |
| Comparison E | SUJ 2 | 1.32 | 0.72 | 0.20 | 0.08 | 61.1 | CN → H at 800° C. → T at 270° C. |
| Comparison F | SUJ 2 | 1.36 | 0.94 | 0.72 | 0.53 | 61.5 | CN → H at 880° C. → T at 310° C. |
| First conventional method G | SUJ 2 | 1.00 | 0.62 | — | — | 59.0 | H at 840° C. → T at 240° C. |

CN: carbonitriding
H: hardening
T: tempering

Run Nos. A to D in Table 1 indicate the rolling bearing samples prepared in accordance with the present invention (which will hereinafter be designated "invention" bearing). Run Nos. E and F indicate the comparative samples (hereinafter designated "comparative bearings"). Run No. G indicates the conventional sample prepared by the first conventional method (which will hereinafter be designated "the first conventional bearing"). All tested bearing samples are of a deep groove ball bearing type (designation #6206; material for the inner race, outer race and rolling elements: SUJ 2).

Invention bearing Nos. A to D were subjected to a heat treatment process including carbonitriding under the conditions specified in below, hardening at temperatures of 840° to 900° C., and tempering for 2 hours at temperatures of 270° to 290° C. The carbonitriding conditions were set as follows:

240° C. for 2 hours. Since no carbonitriding was performed, the surface of the first conventional bearing G had a low carbon content with no nitrogen N at all.

The relationship between tempering temperature (°C.) and maximum expansion (%) was measured on invention bearings A and D, comparative bearings E and F, and the first conventional bearing G. Those bearings were tempered at specified temperatures of 240° to 310° C., and subsequently held at specified temperatures of 130° to 150° C. to measure a maximum expansion (%).

Figure 3:
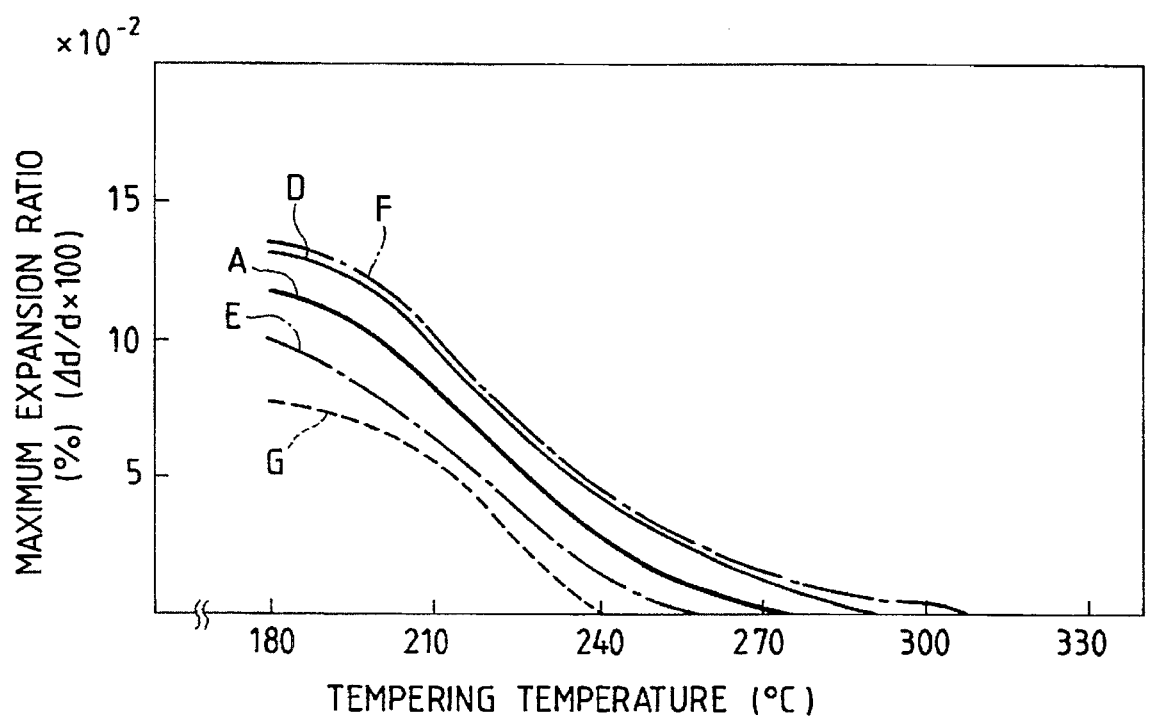
FIG. 3 is a characteristic diagram showing a relationship between tempering temperatures (°C.) and maximum expansion ratios (%)

The results of the measurements are shown in FIG. 3. The outer diameter of the outer race of each bearing was selected as a typical dimension of the bearing. Each bearing was tempered at various temperatures in the hardened state as it was.

To guarantee highest dimensional stability, the maximum expansion (%) is desirably zero, namely, no dimensional changes should occur. As is apparent from FIG. 3, the tempering temperature must be at least 270° C. in order for the concentration of solid solution of N to fall within the relation of 0.1≦N≦0.5 wt % (invention bearings A and D). Comparative bearing F containing more than 0.5 wt % of solid solution of N must be tempered at temperatures higher than 300° C. in order to eliminate the possibility of dimensional changes.

Invention bearings A to D, comparative bearings E and F, and the first conventional bearing G were subjected to endurance tests with insufficient lubrication in the presence of foreign matter. This condition was employed in order to simulate damage of a "surface fatigue" type which typically occurs in rolling bearings under severe lubrication conditions such as operations at high temperatures. Details of the test conditions are set forth below.

| Test temperature | 150° C. |
|---|---|
| Lubrication in the presence of foreign matter | The foreign matter was an iron powder including particles with Vickers hardness of Hv 500 to 600 and grain sizes of 74 to 147 μm. |
| Lubricant | FKB Oil R0150 made by Nippon Oil Co., Ltd. |
| Test load | 640 kgf |
| Critical life | The life of each test bearing was regarded as having come to an end when flaking occurred. |

Figure 4:
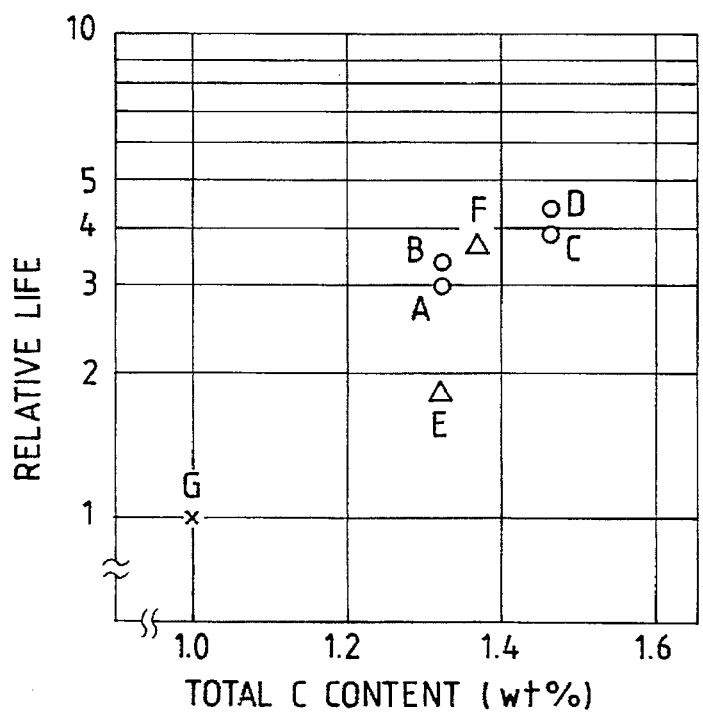
FIG. 4 is a graph showing the effect of the total carbon content on the life of bearings.
Figure 5:
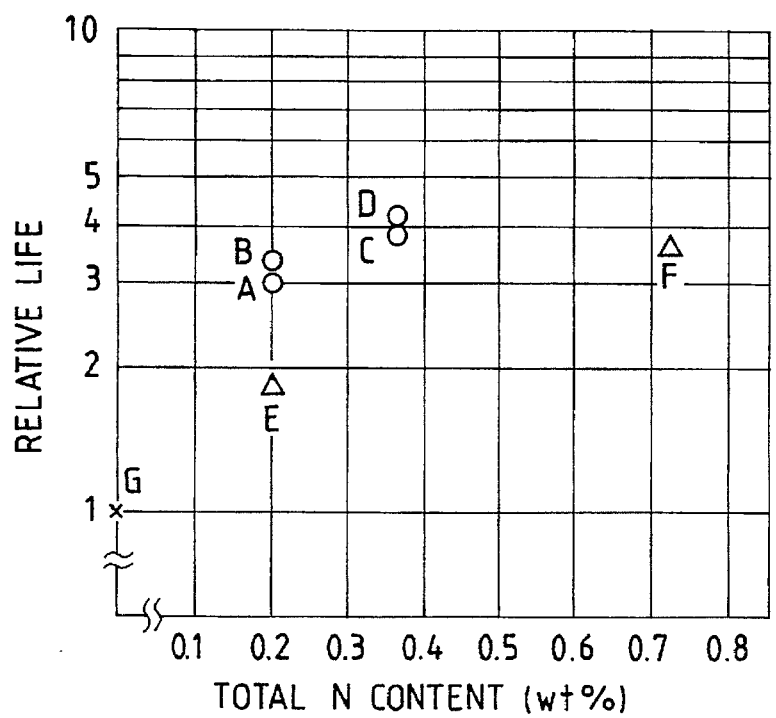
FIG. 5 is a graph showing the effect of the total nitrogen content on the life of bearings.
Figure 6:
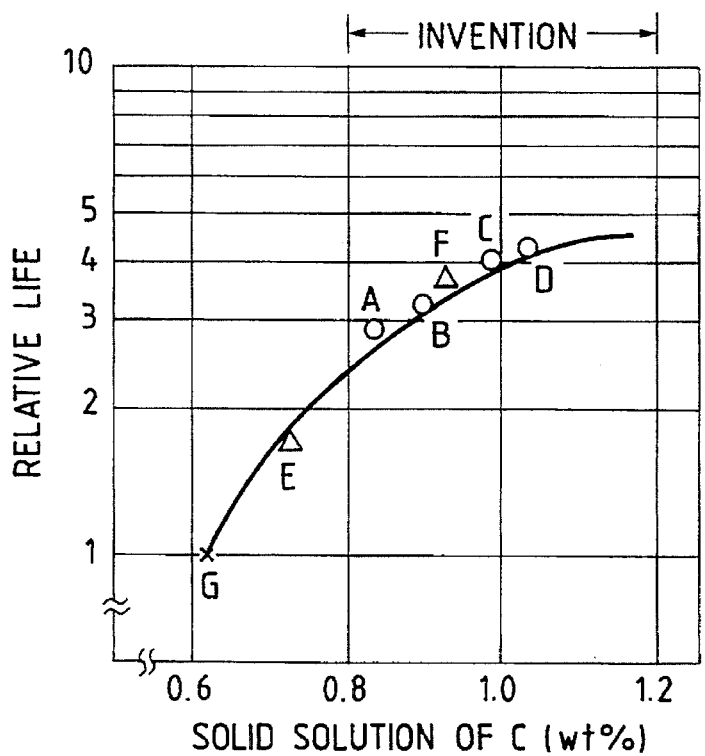
FIG. 6 is a graph showing the effect of the solid solution of C on the life of bearings.
Figure 7:
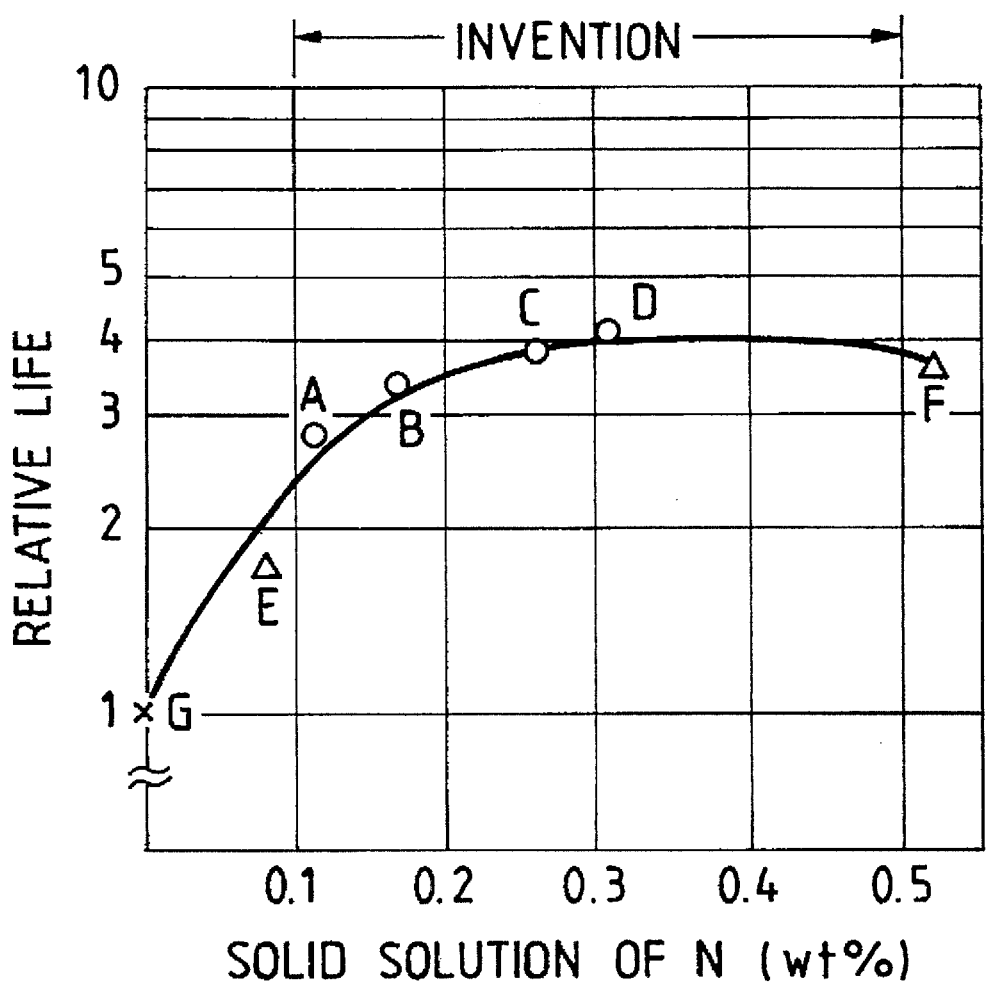
FIG. 7 is a graph showing the effect of solid solution of N on the life of bearings.

The results of the endurance tests are shown in FIGS. 4 to 7 in terms of relative values with the life of the first conventional bearing G being regarded as unity. FIGS. 4 and 5 show the life of the bearings which is affected by the total carbon and nitrogen contents, respectively. FIGS. 6 and 7 show the life of the bearings which is affected by the concentrations of solid solution of C and N, respectively.

As is apparent from FIGS. 4 and 5, the carbonitrided bearings indicated a tendency of improved life characteristics in accordance with the increase of carbon and nitrogen content. However, when the hardening temperature was unduly low, the life became exceptionally shorter than that of invention bearings A to D as typically exemplified by comparative bearing E. It is hence difficult to find a compositional limitation that uniformly associates the life of bearings with their carbon and nitrogen contents contained in the bearings.

On the other hand, the life of bearings with respect to the concentrations of solid solution of C and N can be plotted on smooth curves as shown in FIGS. 6 and 7. Particularly, invention bearings A to D had at least three times as long as the life of the first conventional bearing G which was only directed to secure superior dimensional stability.

Although comparative bearing F had high durability, as shown in FIG. 3, tempering had to be performed at 300° C. or more in order to secure superior dimensional stability. However, as already mentioned, if tempering is performed at high temperatures exceeding 300° C. the hardness of the core of the bearing is reduced. Therefore, there is a high possibility that the surface hardness required for rolling bearings cannot be assured. Hence, bearing F was excluded from the present invention.

Thus, it was confirmed that invention bearings A to D had high dimensional stability while they secured better endurance than comparative bearings E and F and the first conventional bearing G.

In the aforementioned bearing samples, all of inner races, outer races and rolling elements are made of a high carbon steel material under the condition which each has a Rockwell hardness of $H_RC$ 60 or more and the high carbon steel material includes, in a surface thereof, solid solution of carbon C and solid solution of nitrogen N which are adjusted to satisfy relationships of 0.8 wt %≦C≦1.2 wt % and 0.1 wt %≦N≦0.5 wt % and in which the retained austenite existing in the high carbon steel material is adjusted to substantially 0 wt %. However, the present invention is not limited to the rolling bearing-formed in such a manner. Even if at least one of inner races, outer races and rolling elements is made of the high carbon steel material under the above condition, the object of the present invention can also be achieved.

As described above in detail, the rolling bearing of the present invention contains solid solution of carbon C and nitrogen N in the surface of a high-carbon steel material and the concentrations of solid solution of C and N are adjusted to satisfy the relations of 0.8 wt %≦C≦1.2 wt % and 0.1 wt %≦N≦0.5 wt %. As a result, the rolling bearing is improved in life characteristics and, hence, endurance.

Additionally, the retained austenite existing in the high carbon steel material is adjusted to substantially 0 wt %. Hence, there is no dimensional expansion of the rolling bearing due to precipitation of the retained austenite. Further, superior dimensional stability can be secured even in the case where the rolling bearing is used at elevated temperatures.

Moreover, the improvements in the bearing's endurance and dimensional stability are achieved by limiting the concentrations of solid solution of carbon and nitrogen to the above ranges without adding elements that have high resisting property for temper softening to the high carbon chromium steel. In addition, the content of retained austenite is adjusted to substantially 0 wt %. Hence, there causes neither increasing the materials cost nor reducing the productivity.

What is claimed is:

1. In a rolling bearing comprising an inner race, an outer race and a plurality of rolling elements wherein at least one member of the inner race, the outer race and the rolling elements is made of a high carbon steel material and comprises a surface layer having a hardness of $H_RC$ 60 or more, the improvement wherein the surface layer comprises solid solution of carbon (C) and solid solution of nitrogen (N) which satisfy the following relationships:

0.8 wt %≦C≦1.2 wt % and 0.1 wt %≦N≦0.5 wt %, and wherein a retained austenite existing in all portions of the member is adjusted to substantially 0 wt % by tempering at a temperature range of 270° to 300° C. after the member is subjected to carbonitriding and hardening.

* * * * *